(12) United States Patent
Mietke

(10) Patent No.: US 12,197,316 B2
(45) Date of Patent: Jan. 14, 2025

(54) AUTOMATED DECOUPLING OF UNIT TESTS

(71) Applicant: SAP SE, Walldorf (DE)

(72) Inventor: Sebastian Mietke, Reilingen (DE)

(73) Assignee: SAP SE, Walldorf (DE)

( * ) Notice: Subject to any disclaimer, the term of this patent is extended or adjusted under 35 U.S.C. 154(b) by 146 days.

(21) Appl. No.: 17/985,238

(22) Filed: Nov. 11, 2022

(65) Prior Publication Data

US 2024/0160559 A1    May 16, 2024

(51) Int. Cl.
*G06F 11/36*    (2006.01)
(52) U.S. Cl.
CPC ...... *G06F 11/3688* (2013.01); *G06F 11/3684* (2013.01)
(58) Field of Classification Search
CPC .................................................. G06F 11/3668
See application file for complete search history.

(56) References Cited

U.S. PATENT DOCUMENTS

| | | | | |
|---|---|---|---|---|
| 10,445,223 | B1* | 10/2019 | Tkac | G06F 11/3696 |
| 2016/0147642 | A1* | 5/2016 | Haeuptle | G06F 11/3684 |
| | | | | 717/124 |
| 2018/0121319 | A1* | 5/2018 | Ekambaram | G06F 11/3672 |
| 2019/0065349 | A1* | 2/2019 | Sharma | G06F 11/3684 |

* cited by examiner

*Primary Examiner* — Jae U Jeon
(74) *Attorney, Agent, or Firm* — Buckley, Maschoff & Talwalkar LLC

(57) ABSTRACT

Provided is a system and method for automatically decoupling a unit of code from one or more dependencies and executing a unit test on the decoupled unit of code. In one example, the method may include identifying one or more dependencies called by a unit of code, executing an automated test on the unit of code to generate runtime data of the unit of code calling the one or more dependencies, generating one or more test doubles corresponding to the one or more dependencies, respectively, based on the generated runtime data, replacing the one or more dependencies in the unit of code with the one or more test doubles, respectively, to generate a decoupled unit of code, and executing a unit test based on the decoupled unit of code.

20 Claims, 11 Drawing Sheets

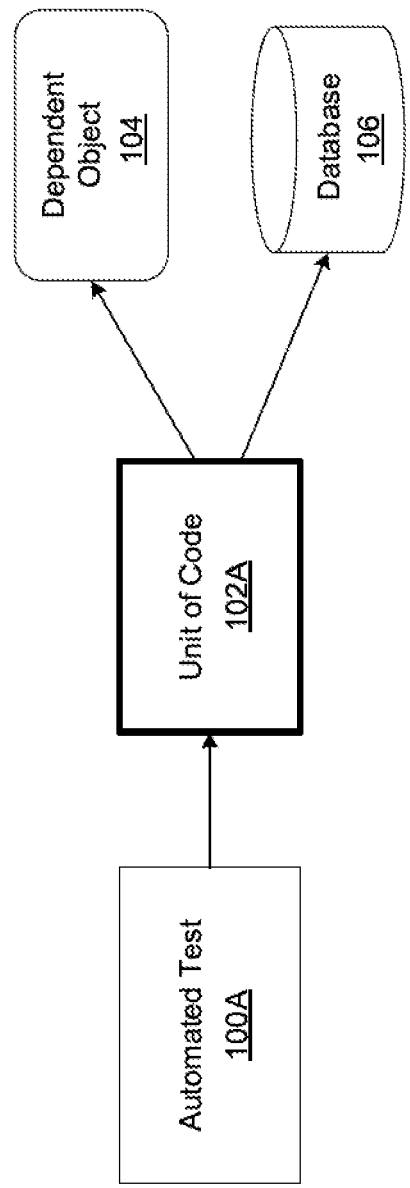

FIG. 3A

```
                    Unit of Code 300

//Method of Class 'CL_SPEC_POST'//
Method Create Special Posting
{
  SELECT amount, currency, partner, duedate,
    FROM plan_post   INTO TABLE lt_planned_posts
                          301

//Create empty document using Class doc_serv//
  IF lt_planned_postings IS NOT INITIAL
      doc_serv->create_doc (EXPORT er_doc = lr_doc
                            CHANGE ct_msg = et_msg)
              302

//Get currency from configuration object//
    CALL FUNCTION 'GET_SPEC_POST_CURR'
      importing ev_currency = lv_currency
   303

//Convert currency//
    this.curr_conv (EXPORT it_planpost = lt_planned_posts
                            it_currency = lv_currency
                    IMPORT it_post_conv = lt_postings_conv)

//Create Document items using Class add_items//
    lr_doc->add_items (EXPORTING it_items = lt_postings_conv
                       CHANGING ct_message = et_message)
           304

//Post Document//
    lr_doc->post().
  END IF.      305
}
```

FIG. 3C

```
                    DB_service_double 351
                   (for Database Dependency)

DATA:   lo_environment        TYPE REF TO if_osql_testenvironment
        lt_plan_post_double   TYPE STANDARD TABLE
        lo_plan_post_data     TYPE REF TO if_osql_test_data
        lo_plan_post_stub     TYPE REF TO if_osql_stub lo_environment = cl_osql_testenvironment=>create
( i_dependency_list = VALUE # (( 'PLAN_SPEC_POST')) ).

lt_plan_post_double = VALUE # ( ( amount   = '100'
                                  currency = 'USD'
                                  partner  = 'BP1'
                                  due_date = '20200101' )

( amount   = '150'
                                  currency = 'USD'
                                  partner  = 'BP2'
                                  due_date = '20200201' )

( amount   = '500'
                                  currency = 'USD'
                                  partner  = 'BP3'
                                  due_date = '20200301' )

lo_plan_post_stub ?=
   lo_environment->getdouble('PLAN_SPEC_POST').

lo_plan_post_data ?=
   cl_osql_test_data=>create( lt_plan_post_double )

lo_plan_post_stub->insert( lo_plan_post_data )
```

FIG. 3D

```
                    Decoupled Unit of Code  300B

//Method of Class 'CL_SPEC_POST'//
Method Create Special Posting
{
  SELECT amount, currency, partner, duedate,
    FROM plan_post   INTO TABLE DB_service_double
                                    \
                                    351

//Create empty document using Class doc_serv//
  IF lt_planned_postings IS NOT INITIAL
      doc_serv_double->create_doc (EXPORT er_doc = lr_doc
                  /                 CHANGE ct_msg = et_msg)
     352

//Get currency from configuration object//
    function_call_double->get_spec_post_curr (
    /   IMPORTING ev_currency = lv_currency )
   353

//Convert currency//
    this.curr_conv (EXPORT it_planpost = lt_planned_posts
                           it_currency = lv_currency
                    IMPORT it_post_conv = lt_postings_conv)

//Create Document items using Class add_items//
    double_doc->add_items (EXPORT it_items = lt_postings_conv
                 /             CHANGE ct_message = et_message)
            354

//Post Document//
    double_doc->post().
                    \
  END IF.           355
}
```

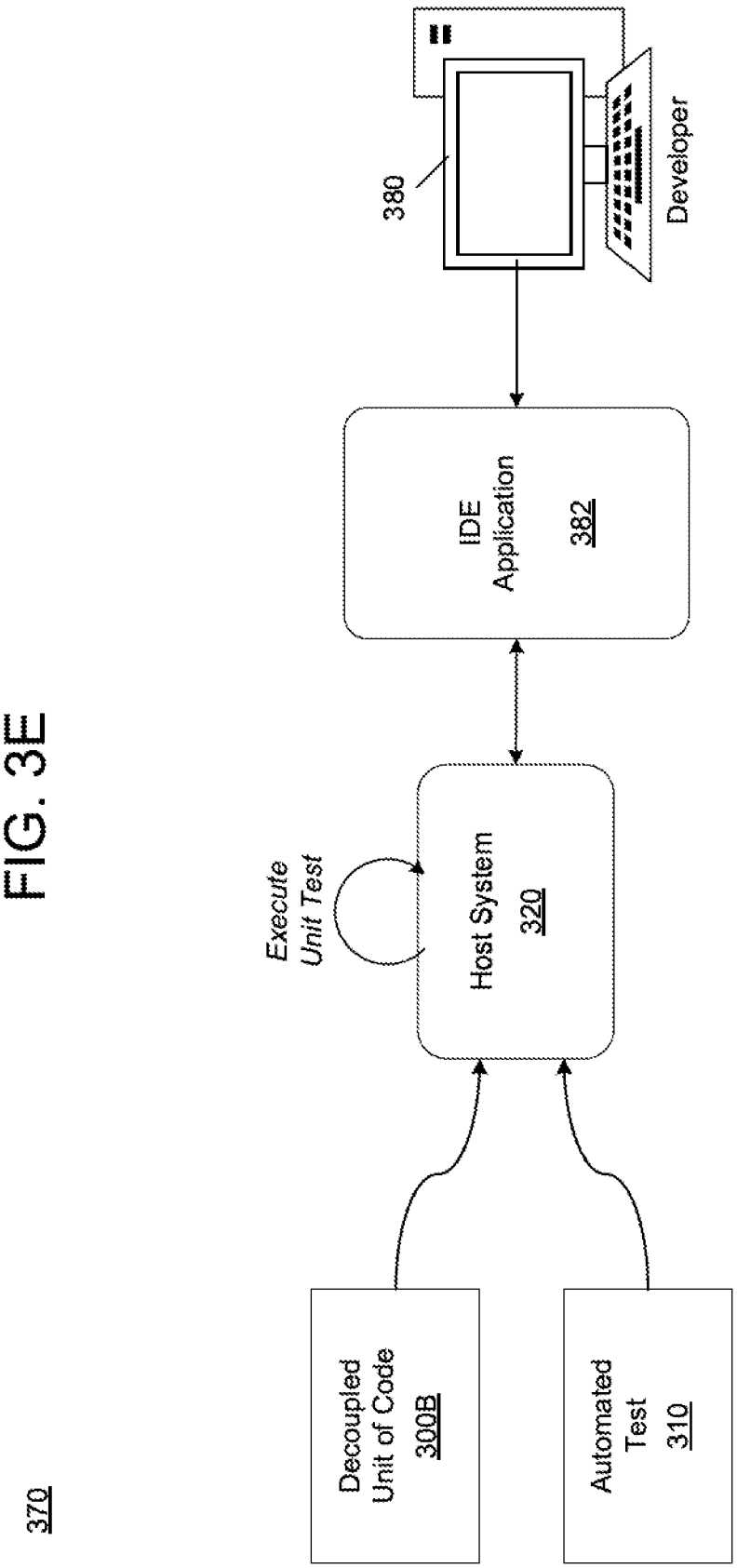

(With Test Doubles)

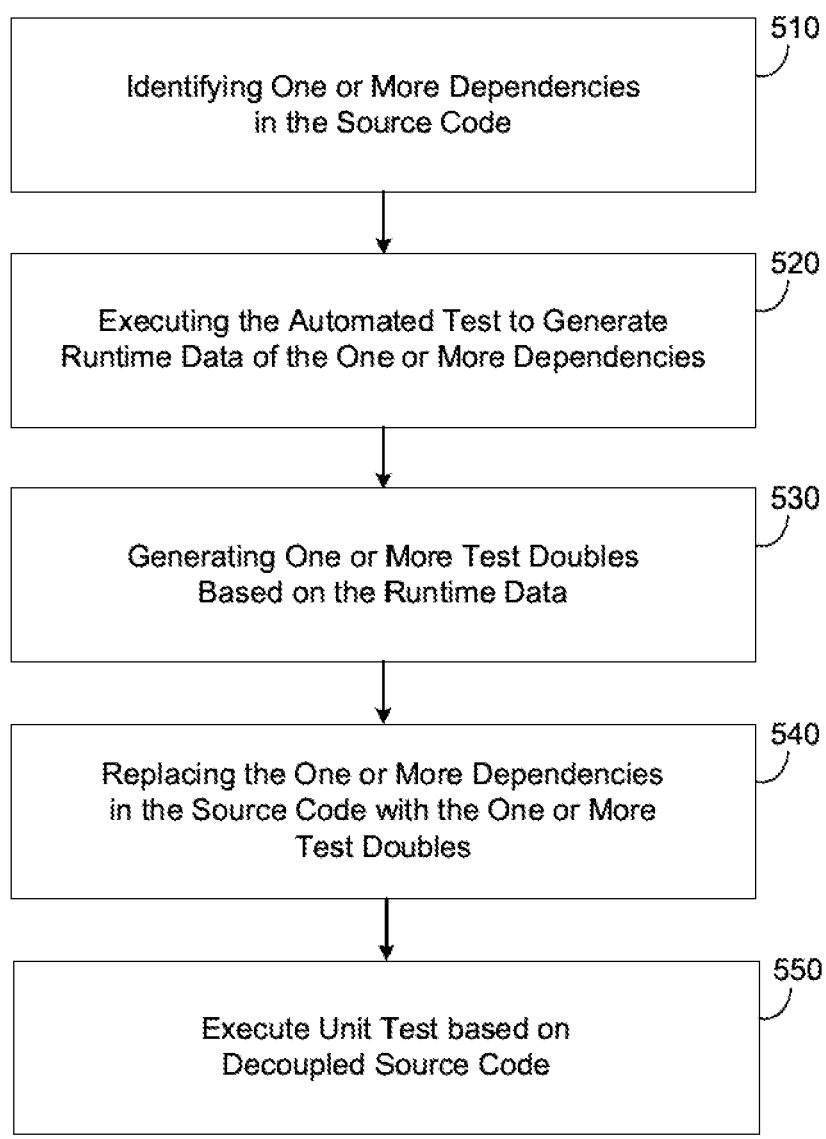

AUTOMATED DECOUPLING OF UNIT TESTS

BACKGROUND

When code for new software functionality is created, the code is often tested to ensure the code and the software functionality are operating properly. One common type of test is referred to as a unit test. A unit test is designed to test a particular unit of code (e.g., class, routine, function module, etc.) without testing any of the dependencies of the unit of code. The unit of code to be tested by the unit test may also interact with various dependencies such as functions, data services, classes of code, application programming interfaces, and the like, of the software and of other programs which the developer does not want to test.

To prevent a unit test from improperly testing the dependencies of the unit of code, the code may go through a decoupling process. The decoupling process is usually done by the developer prior to performing the testing. For example, the developer may write test doubles for the dependencies and replace the code modules with the test doubles during testing. This process is very time consuming and requires a skilled programmer.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 1A-1B are diagrams illustrating examples of types of test doubles being used to replace dependencies in accordance with example embodiments.

FIGS. 3A-3E are diagrams illustrating a process of decoupling dependencies from a unit of code to be tested in accordance with example embodiments.

FIG. 5 is a diagram illustrating a method of decoupling a dependency from code under test in accordance with an example embodiment.

Figure 2A:
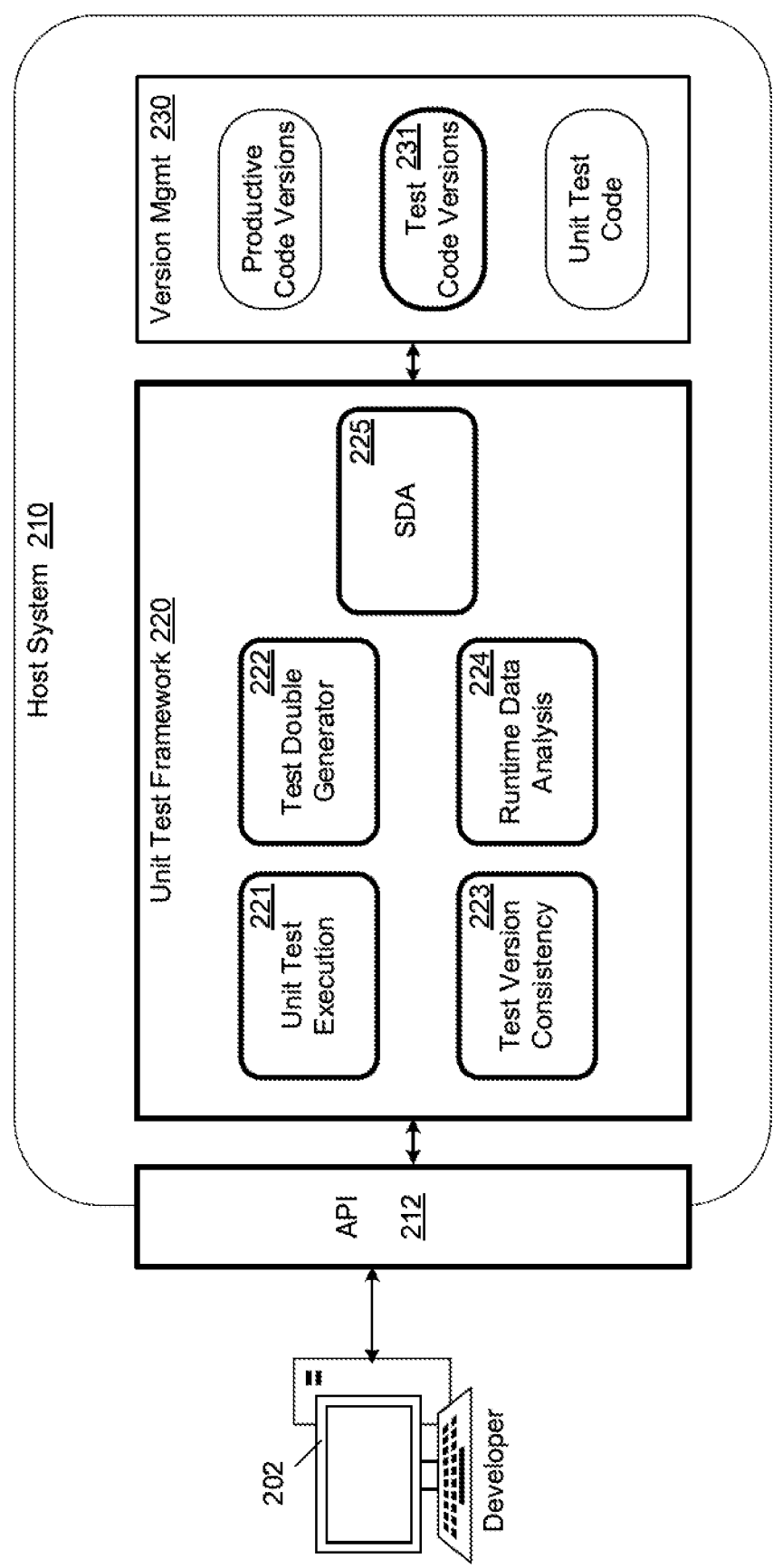
FIG. 2A is a diagram illustrating a host platform for executing unit tests in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

In software testing, unit tests are essential to ensure that the source code of a software program is working as expected. There are numerous benefits to writing unit tests because they help with regression, provide documentation, and facilitate proper software design. As an example, unit tests may be configured to test/check whether a calculation routine generated by the unit of code is working properly, test/check whether inputs and/or outputs to the unit of code are working properly, test/check the functional behavior of the unit of code, and the like.

In general, a unit (i.e., unit of code) under test may depend on other units, which have their own unit tests. However, the purpose of a unit test is to test only the corresponding unit of code but not its dependencies. Therefore, the dependencies must be decoupled from the source code before execution of the unit test. This is usually done by a human such as a skilled developer creating test doubles for the dependencies. There are existing frameworks which can be used to decouple different kinds of dependencies. These test doubles must be set up and configured. But developers typically spend a large portion of the development time and resources creating test doubles.

Decoupling is a complex process of isolating the unit of code under test (i.e., that performs a specific task) from other code that is not part of the unit test and that performs another task. It's typically implemented by removing dependencies within the unit of code and replacing them with test doubles or dummies at runtime of the unit test. Dependencies can include calls to other functions, subroutines, methods, classes, etc. Dependencies can also include database accesses, data services, and the like. The decoupling enables the unit of code to be more maintainable, reusable, and easier to test. By decoupling dependencies and functionality from the unit of code, there is less chance of introducing errors when updating or replacing parts of the system. At first glance, this concept might seem simple. But as applications become larger and more complex, this becomes impractical to implement manually. Because of this, in some cases, dependencies are not decoupled due to a lack of time or because a developer is not familiar with decoupling techniques. Therefore, the resulting automated tests are not real unit tests.

The example embodiments are directed to a host platform that can decouple dependencies from a unit of code that is subject to a unit test. The host platform may decouple the dependencies by automatically replacing the dependencies within the unit of code with test doubles generated in an automated manner. The test doubles may be substituted for the actual code in the source code of the unit of test. By automatically decoupling the dependencies from the code under test, the host platform relieves the developer from having to implement such test doubles and integrating them into the unit of code. Instead, the host platform can automatically generate the test doubles and integrate them into the code under test. Furthermore, the host platform may then execute the unit test and provide the results to an integrated development environment (IDE).

By automatically decoupling the dependencies from the code under test, the example embodiments improve the performance of the unit test by ensuring that all of the dependencies are removed and replaced with a correct test double. In addition, by automatically decoupling the dependencies from the code under test, the developer is relieved from having to write such code. This can save the developer hours of time and allow the developer to work on other activities making the developer more efficient. In the example embodiments, the dependencies are detected automatically from within the code by the host system. Any type of test double can be generated by the software system itself. Examples of types of test doubles include mocks for methods and other routines, a data source such as database tables, SELECT statements from a structured query language (SQL) query, and the like.

FIGS. 1A-1B illustrate an example of a test double being used to replace a dependency within a unit of code in accordance with example embodiments. Referring to FIG. 1A, an automated test 100A is shown. The automated test 100A includes a unit of code 102A to be tested, an object 104 such as a function, service, class, etc., and a database 106 that is accessed by the object 104. In this case, the object 104 and the database 106 are dependencies of the unit of code 102A. These dependencies may include lines of code, statements, etc., within the unit of code 102A which point to the dependencies. In FIG. 1A, the automated test 100A is not considered a unit test because the dependencies are still included in the unit of code 102A.

Referring now to FIG. 1B, the automated test 100A can be modified into a unit test 100B by decoupling the object 104 and the database 106 from the unit of code 102A and replacing it with a test double 108. To do this, the unit of code 102A can be modified to a unit of code 102B by replacing the pointers/calls to the dependencies within the unit of code 102A with a pointer/call to the test double 108. The pointers or calls may include application programming interface (API) calls, ODATA requests, pointers to code modules in the same software program, and the like. The test double 108 may emulate the function performed by the object 104 when accessing the database 106. As an example, the test double 108 may be configured to receive queries from the unit test 100B and return results to the unit of code 102B. The values returned may be predefined by the test double 108. Any subsequent tests of the unit of code 102B can be performed by the unit test 100B which has been modified to execute the test double 108 rather than the object 104 initially provided by the developer thereby saving the developer the time of having to decouple the dependencies from the unit of code 102A.

Software development usually happens in steps or phases. A unit test may be testing a piece of code where at least some of the dependencies are already existing and working as expected. These dependencies can be detected and replaced with test doubles by the host platform described herein. The host platform may also execute the code with its dependencies during an initial run and use a recording mechanism to analyse data passed to and retrieved from the dependencies. With this it is possible to generate test doubles automatically.

For example, an automated unit test may be executed first, with all of its dependencies coupled therein. During this first run of the unit test, a data flow between the unit of code and the dependencies can be recorded and used to generate source code for test doubles. The source code for these test doubles is then generated. The original calls to the dependencies within the unit of code may be replaced with the test doubles. Accordingly, subsequent unit tests on the unit of code are performed using the test doubles with the dependencies decoupled. With this, the automated test become actual unit tests.

Figure 2B:
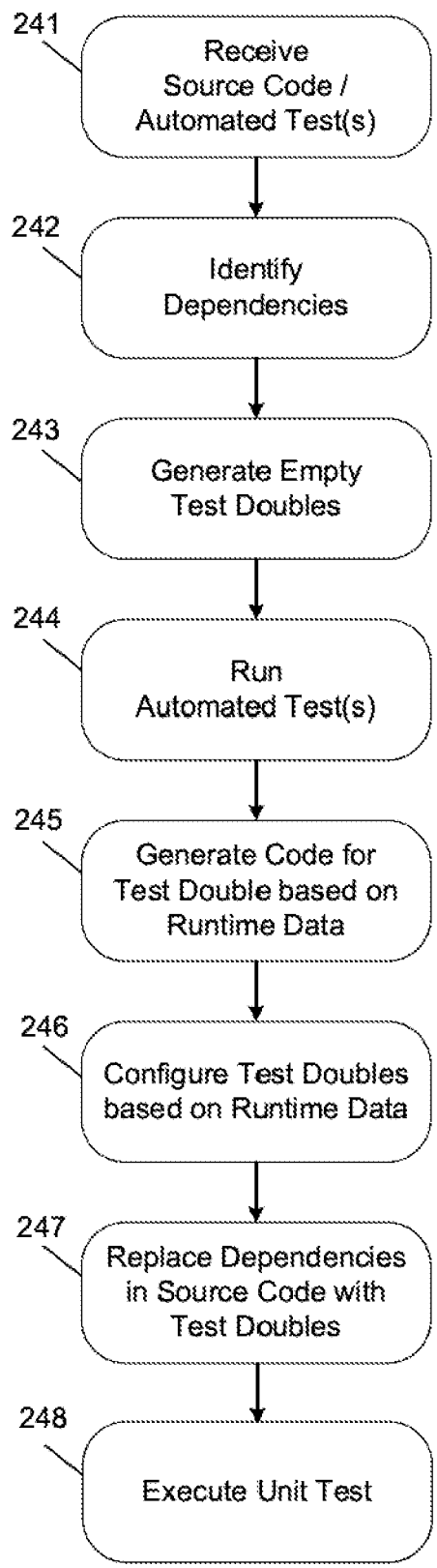
FIG. 2B is a diagram illustrating a process of configuring test double via the host platform of FIG. 2A, in accordance with example embodiments.

FIG. 2A illustrates an architecture 200 of a host system 210 for executing unit tests in accordance with example embodiments, and FIG. 2B illustrates a process 240 of configuring test double via the host system 210 of FIG. 2A, in accordance with example embodiments. Referring to FIG. 2A, the host system 210 may include a software application, a server, a cloud platform, a combination thereof, and the like. The host system 210 hosts a unit test framework 220 according to example embodiments. The unit test framework 220 can automatically decouple dependencies from a unit of code and generate a unit test. The unit test framework 220 may include an API 212 or other service which can be called to execute a unit test for one or more productive routines, such as methods of classes. This is just an example, the same techniques apply also for other units of code such as, programming language dependent types of routines.

In the example of FIG. 2A, the unit test framework 220 includes a unit test execution module 221 which is configured to execute automated tests prior to decoupling and unit tests generated from decoupling the automated tests. Referring now to FIGS. 2A-2B, in 241, a developer 202 may upload an automated test along with a unit of code to the host system 210. The automated test may include test(s) for checking the performance of the unit of code in some way. However, the developer 202 is spared from having to decouple the dependencies from the unit of code or generate the test doubles for the dependencies.

The automated tests are not unit tests at this point, since the dependencies haven't been decoupled yet. The unit test framework 220 also includes a source code dependency analyzation (SDA) module 225 which can retrieve the unit of code under test from a source code version management system 230 and derive all its dependencies. For example, in 242, the SDA module 225 may identify dependencies from predefined templates which are stored within the SDA module 225. The templates may include predefined patterns of various dependencies including database dependencies, class dependencies, method dependencies, and the like. Gathering the information about the dependencies from the source code version management system may also be performed.

Based on the dependencies identified by the SDA module 225, a test double generator 222 may generate empty test doubles for each of the identified dependencies in 243. The test doubles may initially be empty or missing some source code. Here, the test doubles may initially be generated based on basic source code templates of the test doubles which may be stored within the test double generator 222 or in a data store that is otherwise accessible to the test double generator 222. For example, a database dependency may have a predefined test double template known to the test double generator 222. As another example, an external subroutine may have a predefined test double. As another example, a call to an external method or class may have a predefined test double, and the like.

In order to complete the test doubles, in 244, the host system 210 may execute the unit of code with the dependencies still therein to generate runtime data of the unit of code interacting with the dependencies. A flow of data between the unit of code and the one or more dependencies may be recorded by the host system 210, for example, via a log, table, file, or the like. In 245, a runtime data analyzation (RDA) component 224 may analyze the recorded runtime data generated by running the coupled version of the unit of code to identify a data flow between the one or more dependencies and the unit of code. The data flow may include data values, calls, functions, etc., that are to be included in the test doubles. With this, it becomes clear which data will be passed to the dependency and which data is retrieved from the dependency in the test scenario. In 246, the observed data flow between the unit of code and the one or more dependencies can be used to enrich the empty test doubles generated by the test double generator 222. For example, the test doubles may be configured to return any desired values and accept any desired calls.

With this, working test doubles can be created by the system automatically, if the corresponding dependency has already been implemented. As an example, a complete test double can now be created automatically. Because the runtime data from the actual productive dependencies is used, this process is called test-double recording. If the dependency hasn't been implemented yet, at least the empty test double could be generated. It is assumed, that at least the signature of the dependency already exists (e.g., types of importing/exporting parameters are known).

In 247, the host system 210 replaces the calls/pointers to the dependencies within the unit of code with calls/pointers to the test doubles. In other words, the unit of code is modified to no longer communicate with the dependency. Instead, the unit of code is duplicated generating a productive version of the code and a test version of the code. The test version is used to communicate with a test double of the dependency. To do this, the test version of the source code can be modified to interact with the test double. The result is that the automated test is turned into a unit test because the dependencies have now been fully decoupled from the unit of code. Accordingly, in 248, the unit test execution module 221 may execute the unit test which includes executing the automated test on the decoupled unit of code.

A lot of dependencies can be exchanged at runtime with their test doubles automatically, using existing functionality. As an example, a test double for a database table may not require any further actions. However, it is still quite common that the productive code must be adjusted, so that the dependencies are exchanged with their test doubles. As an example, the test double might consist of a local class, implementing one or more interface-methods. The productive instance of this dependency must be replaced by an instance of this local test double class, at runtime of the test. There are already test double frameworks available for different programming languages, which would also overcome this issue for many kinds of dependencies, too. As an example, there is even a test double framework available, to decouple calls to ABAP Function Modules. No adjustment of the productive code is necessary in this case. But the duplicate test version of the code is modified to exchange a productive call with a test double instead of the actual dependency.

Nevertheless, not every type of dependency can be decoupled automatically, just by calling the corresponding test double framework. Instead, an injection mechanism might be required. In the example embodiments, this can be avoided by creating a test copy of the productive code (i.e., a duplicate of the unit of code). Here, the duplicate of the unit of code would not have the dependencies but would instead call the test doubles of the dependencies. Meanwhile, the original version of the code would be modified to call the duplicate instead of the dependencies. By replacing the calls to the dependencies with calls to the duplicate unit of code, this creates two versions of the code under test, a productive version and a test version. The productive version contains only calls to the productive dependencies. The test version contains only calls to the test doubles.

Here, a test version consistency (TVC) component 223 ensures the consistency between the two versions, in case the productive version is changed. The TVC is also responsible to create an initial test version, if no test version exists so far. The version information may be managed within a test code version data store 231 of the source code version management system 230. The developer 202 doesn't have any possibility to influence the test version in general. It is only possible, to adjust the actual test data, it is not possible to change to logic. The test version is always generated by the TVC component 223 from the productive version of the code under test. As soon as the productive version is activated, the corresponding test version is adjusted automatically.

Figure 3B:
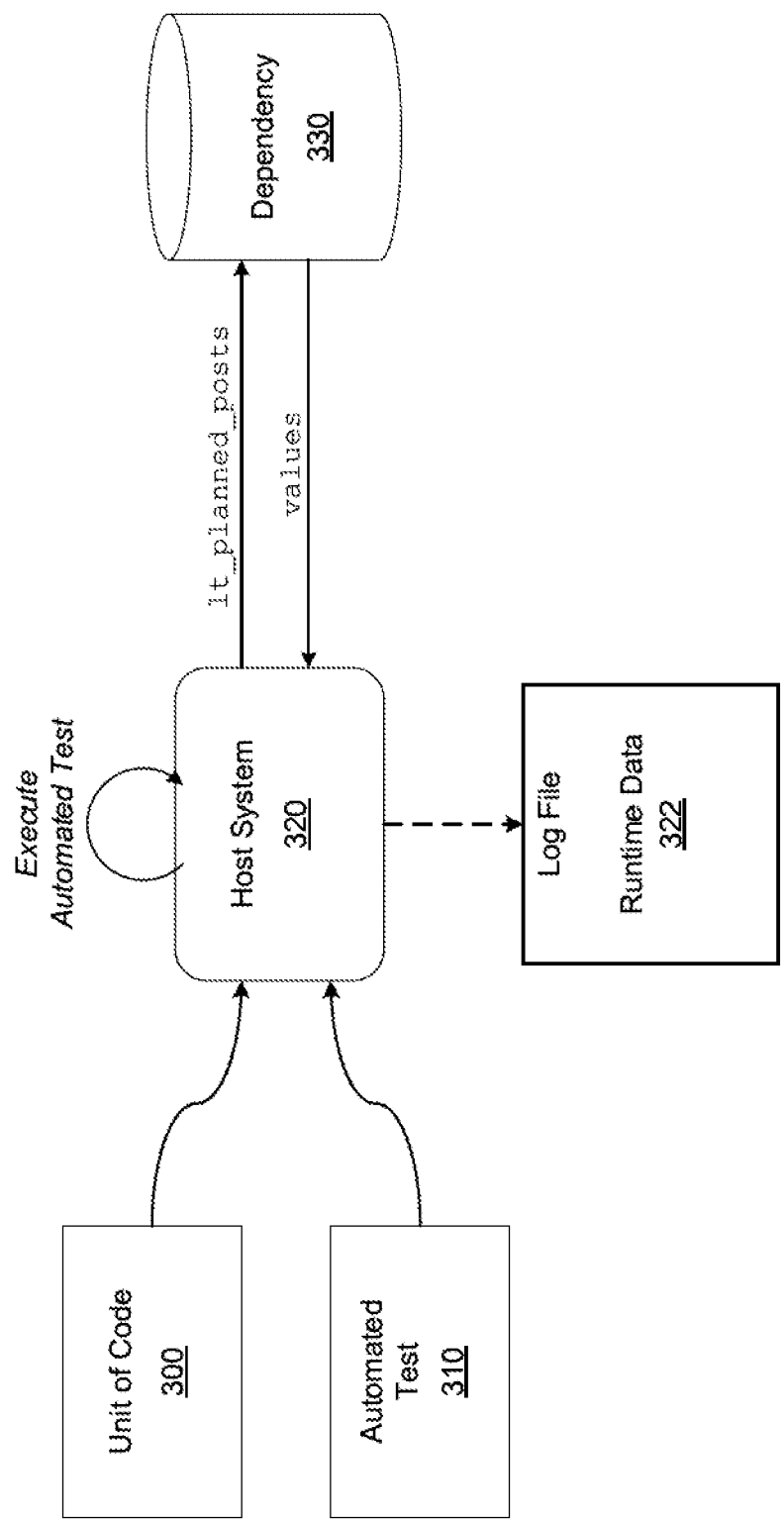

FIGS. 3A-3E illustrate a process of decoupling dependencies from a unit of code to be tested in accordance with example embodiments. Referring to FIG. 3A, a unit of code 300 (i.e., source code) is shown. In this case, the unit of code 300 includes multiple dependencies which are still coupled thereto. As noted above, the host system described herein can identify these dependencies based on the content within the unit of code 300. For example, a dependency 301 includes a database dependency that stores data in a particular table of a database. A dependency 302 includes a function dependency where the function is included in a particular class of code that is external from the unit of code 300. Further, dependencies 303, 304, and 305 include method dependencies where the methods are from classes of code that are external to the unit of code 300.

The identified dependencies may be monitored during an execution of the unit of code 300 as shown in the example of FIG. 3B. FIG. 3B illustrates a process 340 of a host system 320 executing an automated test 310 based on the unit of code 300 from FIG. 3A. In this example, the dependencies are still coupled to the unit of code 300. The runtime data includes a data flow between the unit of code 300 and a dependency 330 (in this example a database). Here, the data flow may include calls, requests, data values, and the like, which are transferred in between the unit of code 300 and the dependency 330 during execution of the automated test 310. The runtime data 322 may be recorded in a log file or the like.

FIG. 3C illustrates an example of a test double 351 for the dependency 330 generated based on the runtime data 322 captured in the process 340 of FIG. 3B. Here, the host system 320 may fill-in an empty or partially empty test-double template with additional code and syntax corresponding to the runtime data that is recorded during the process 340 of FIG. 3B. For example, calls, data values, and the like, may be identified from the runtime data 322 and added to the source code of the test double 351 thereby filling in the empty or partially empty source code of the test double 351. In the example of FIG. 3C, the test double 351 is configured to return different sets of values based on different partners that request the data values. The test double 351 may be configured to receive and respond to calls and also to provide the data values that are expected from the dependency 330.

Before the unit of code 300 can be properly tested as a "unit test", the dependencies 301, 302, 303, 304, and 305 need to be removed and replaced with the test doubles that are generated by the host system, in the test version. In the example of FIG. 3D, the unit of code 300 has been modified into a decoupled unit of code 300B. In this example, the decoupled unit of code 300B includes calls to test doubles 351, 352, 353, 354, and 355, in place of the calls to the dependencies 301, 302, 303, 304, and 305, respectively.

With the dependencies now decoupled from the unit of code the automated test 310 can be performed again. In this instance, the automated test 310 will be a unit test because the dependencies have now been removed from the unit of code. For example, FIG. 3E illustrates a process 370 of re-executing the automated test 310. However, in this example, the automated test 310 is executed on the decoupled unit of code 300B. The results of the executed unit test may be displayed within a user interface of a development environment 382 that is being accessed by a user device 380 such as a developer.

Figure 4A:
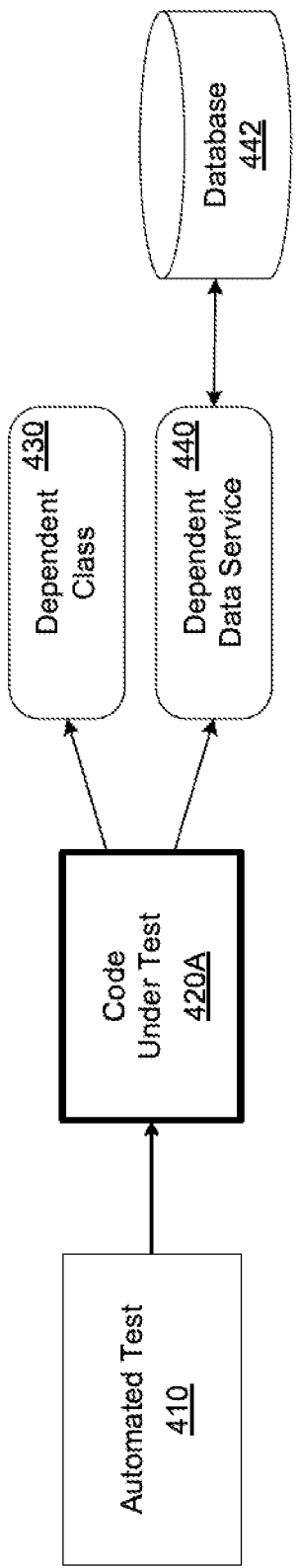
FIGS. 4A-4B are diagrams illustrating a process of generating duplicate code for a test double in accordance with example embodiments.
Figure 4B:
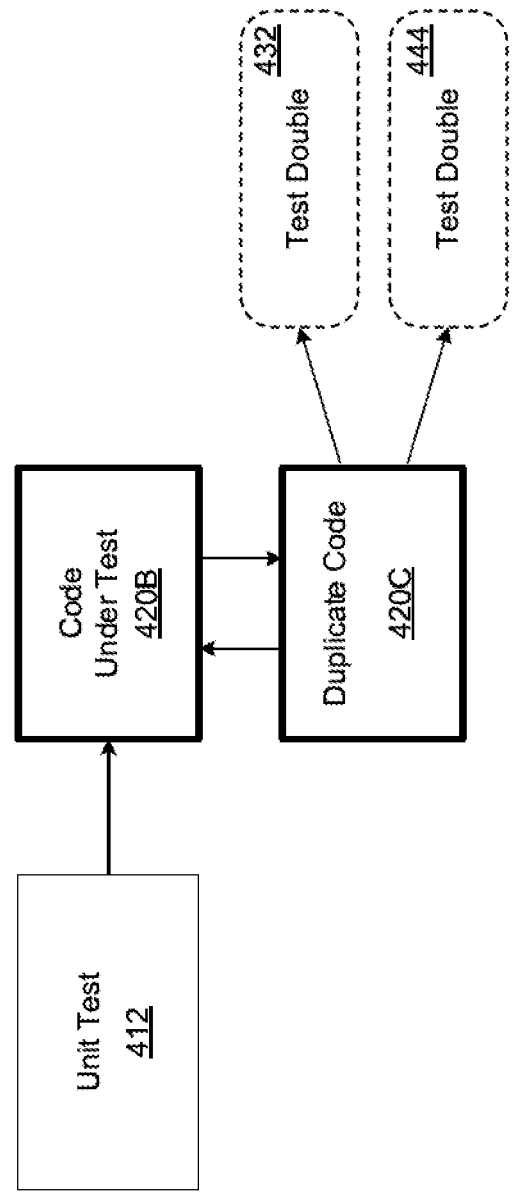

FIGS. 4A-4B illustrate process for generating duplicate code for a test double in accordance with example embodiments. Referring to FIGS. 4A and 4B, in some cases, a dependency cannot be decoupled from the source code that is being tested or it may be easier/more efficient to create a double of the source code that works with the test doubles. In the example of FIG. 4A, a developer uploads a unit of code 420A and an automated test 410 for testing the unit of code 420A. In this example, the unit of code 420A includes a dependency to a class 430 and a dependency to a database 442 via a data service 440. Rather than modify the unit of code 420A to execute test doubles, the host system can generate a duplicate version of the unit of code 420C and modify it to point to test doubles 432 and 444 instead of the dependencies (i.e., the class 430 and the data service 440/database 442). The duplicate version is referred to herein as the test version. In addition, the host system may also modify the unit of code 420A into a modified unit of code 420B to call the duplicate version of the unit of code 420C when these dependencies are encountered during execution of the modified unit of code 420B. The result is a unit test 412 that will execute the test version of the code (modified unit of code 420B) which interacts with the tests doubles 432 and 444 instead of the actual dependencies 430, 440, and 442.

FIG. 5 illustrates a method 500 of decoupling a dependency from code under test in accordance with an example embodiment. For example, the method 500 may be performed by a database node, a cloud platform, a server, a computing system (user device), a combination of devices/nodes, or the like. Referring to FIG. 5, in 510, the method may include identifying one or more dependencies called by a unit of code. Here, the unit of code may be a unit of code from a larger software program such as a software application, service, module, class, or the like.

In 520, the method may include executing an automated test on the unit of code to generate runtime data of the unit of code calling the one or more dependencies. A data flow between the unit of code and the one or more dependencies can be recorded by the host and used to generate source code for test doubles. The recorded data may be stored in a file, log, etc.

In 530, the method may include generating one or more test doubles corresponding to the one or more dependencies, respectively, based on the generated runtime data. In 540, the method may include replacing the one or more dependencies in the unit of code with the one or more test doubles, respectively, to generate a decoupled unit of code. In 550, the method may include executing a unit test based on the decoupled unit of code.

In some embodiments, the identifying may include identifying a database dependency within the unit of code, and the generating may include generating a test double for the identified database dependency which returns values that are recorded within the runtime data generated during the execution of the automated test. In some embodiments, the identifying may include identifying values that are provided from the database to the unit of code based on the generated runtime data, and causing the test double to return the identified values when called by the unit of code. In some embodiments, the identifying may include identifying a dependency to another code module, and replacing the another code module with a test double. For example, the another code module may include at least one of a class, a function, and a method which are included in code that is external to the unit of code.

In some embodiments, the executing may include recording a data flow between the unit of code and the one or more dependencies to generate the runtime data. In some embodiments, the generating may include generating an empty container for a test double based on a dependency identified from the unit of code, and filling in the empty container with source code for the test double based on the generated runtime data. In some embodiments, the method may further include generating a double of the source code, deploying the double, and calling the double to call the one or more test doubles during execution of the unit test.

Figure 6:
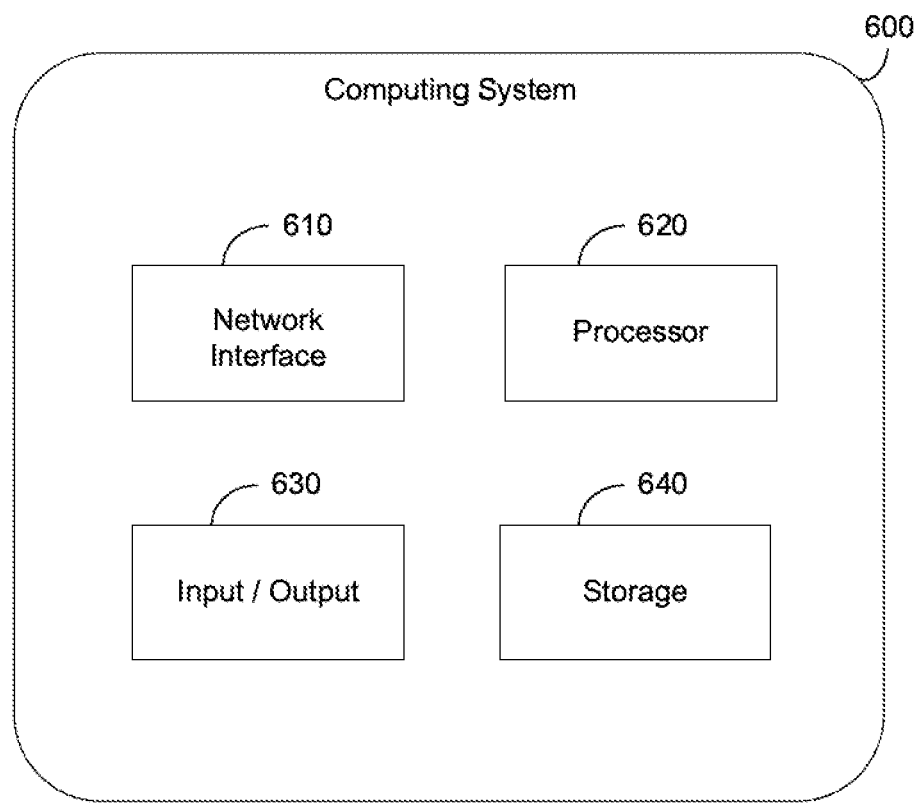
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 6. In some embodiments, the storage 640 may include a data store having a plurality of tables, records, partitions and sub-partitions. The storage 640 may be used to store database records, documents, entries, and the like.

As an example, the storage 640 may store a unit of code and an automated test for testing the unit of code. The processor 620 may identify one or more dependencies of the unit of code which communicate with the unit of code during runtime, execute the automated test on the unit of code to generate runtime data of the one or more dependencies and the unit of code, generate source code for one or more test doubles corresponding to the one or more dependencies based on the generated runtime data, replace the one or more dependencies in the unit of code with the one or more test doubles, respectively, to generate a decoupled unit of code, and execute the automated test based on the decoupled unit of code.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a memory configured to store a unit of code and an automated test; and
    a processor configured to automatically:
        identify one or more dependencies of the unit of code which communicate with the unit of code during runtime based, at least in part, by comparing the unit of code with templates having predefined patterns of code dependencies,
        generate empty test doubles for each of the identified one or more dependencies,
        execute the automated test on the unit of code to generate runtime data of the one or more dependencies and the unit of code,
        analyze the runtime data to identify a data flow between the one or more dependencies and the unit of code,
        configure the test doubles to return one or more desired values or accept desired calls determined based on the generated runtime data,
        replace the one or more dependencies in the unit of code with the one or more configured test doubles, respectively, to generate a decoupled unit of code,
        execute the automated test on the decoupled unit of code, and
        store results of the automated test on the decoupled unit of code in a storage device.

2. The computing system of claim 1, wherein the processor is configured to identify a database dependency within the unit of code, and generate a test double for the identified database dependency.

3. The computing system of claim 2, wherein the processor is configured to identify values that are provided from the database to the unit of code based on the generated runtime data, and cause the test double to return the identified values when called by the unit of code.

4. The computing system of claim 1, wherein the processor is configured to identify a dependency to another code module, and replace the another code module with a test double.

5. The computing system of claim 4, wherein the another code module comprises at least one of a class, a function, and a method which are included in code that is external to the unit of code.

6. The computing system of claim 1, wherein the processor is configured to record a data flow between the unit of code and the one or more dependencies during an initial execution of the automated test to generate the runtime data.

7. The computing system of claim 1, wherein the processor is configured to fill in an empty container with source code for one of the empty test doubles based on the generated runtime data.

8. The computing system of claim 1, wherein the processor is configured to generate a double of the unit of code, deploy the double of the unit of code, and call the double of the unit of code to call the one or more test doubles during execution of the unit test.

9. A method comprising:
    automatically identifying one or more dependencies called by a unit of code based, at least in part, by comparing the unit of code with templates having predefined patterns of code dependencies;
    generating empty test doubles for each of the identified one or more dependencies;
    executing an automated test on the unit of code to generate runtime data of the unit of code calling the one or more dependencies;

analyzing the runtime data to identify a data flow between the one or more dependencies and the unit of code;

configuring the test doubles to return one or more desired values or accept desired calls determined based on the generated runtime data;

replacing the one or more dependencies in the unit of code with the one or more configured test doubles, respectively, to generate a decoupled unit of code;

executing a unit test on the decoupled unit of code; and storing results of the automated test on the decoupled unit of code in a storage device.

10. The method of claim 9, wherein the identifying comprises identifying a database dependency within the unit of code, and the generating comprises generating a test double for the identified database dependency.

11. The method of claim 10, wherein the identifying comprises identifying values that are provided from the database to the unit of code based on the generated runtime data, and causing the test double to return the identified values when called by the unit of code.

12. The method of claim 9, wherein the identifying comprises identifying a dependency to another code module, and replacing the another code module with a test double.

13. The method of claim 12, wherein the another code module comprises at least one of a class, a function, and a method which are included in code that is external to the unit of code.

14. The method of claim 9, wherein the executing comprises recording a data flow between the unit of code and the one or more dependencies to generate the runtime data.

15. The method of claim 9, further comprising filling in an empty container with source code for one of the empty test doubles based on the generated runtime data.

16. The method of claim 9, wherein method further comprises generating a double of the unit of code, deploying the double of the unit of code, and calling the double to call the one or more test doubles during execution of the unit test.

17. A non-transitory computer-readable medium comprising instructions which when executed by a processor cause a computer to perform a method comprising:

automatically identifying one or more dependencies called by a unit of code based, at least in part, by comparing the unit of code with templates having predefined patterns of code dependencies;

generating empty test doubles for each of the identified one or more dependencies;

executing a test on a unit of code to generate a data flow between the unit of code and one or more dependencies of the unit of code;

analyzing the data flow between the one or more dependencies and the unit of code;

recording information about the data flow generated during the execution of the test;

configuring the test doubles to return one or more desired values or accept desired calls determined based on the information recorded about the data flow;

replacing the one or more dependencies in the unit of code with the one or more configured test doubles, respectively, to generate a decoupled unit of code;

executing a unit test on the decoupled unit of code; and storing results of the automated test on the decoupled unit of code in a storage device.

18. The non-transitory computer-readable medium of claim 17, wherein the data flow comprises a data flow between a database dependency and the unit of code, and the generating comprises generating a test double for the database dependency.

19. The non-transitory computer-readable medium of claim 17, wherein the method further comprises identifying a dependency to another code module, and replacing the another code module with a test double.

20. The non-transitory computer-readable medium of claim 17, further comprising filling in an empty container with source code for one of the empty test doubles based on the information recorded about the data flow.

* * * * *